April 25, 1944.   H. LEHDE   2,347,200
METHOD AND APPARATUS FOR EFFECTING ELECTRICAL MEASUREMENTS
Filed July 9, 1942

INVENTOR
Henry Lehde
BY
Popp and Popp
ATTORNEYS

Patented Apr. 25, 1944

2,347,200

UNITED STATES PATENT OFFICE 2,347,200

METHOD AND APPARATUS FOR EFFECTING ELECTRICAL MEASUREMENTS

Henry Lehde, Brooklyn, N. Y.

Application July 9, 1942, Serial No. 450,258

6 Claims. (Cl. 236—69)

This invention relates to a method and apparatus for obtaining electrical measurements and more particularly to such a method and apparatus for detecting the polarity and magnitude of small direct current voltages and employing such voltages to control any desired mechanism, process or condition, or to indicate or record any variable dependent on or associated with such voltages. The invention is particularly useful in connection with balancing electrical networks, as described in my copending application Ser. No. 402,802 for Method and apparatus for automatically adjusting electrical networks, filed July 17, 1941, of which this is a continuation in part.

The invention is essentially directed to a simple and efficient method and apparatus for generating an A. C. voltage, the magnitude and polarity of which are dependent upon the magnitude and polarity of a small D. C. voltage. While it is usually impracticable to amplify a D. C. voltage, the A. C. voltage may be readily amplified for indicating, recording or control purposes.

One of the principal objects of the invention is to provide a very sensitive, compact and reliable method and apparatus for adapting the polarity and magnitude of very small direct current voltages to control any indicating, recording or controlling mechanism.

Another object is to provide such apparatus in which wear and the necessity for adjustment are eliminated in the elements employed to convert the direct current into alternating current.

A further purpose is to eliminate all sliding contacts, such as are found in slip ring assemblies commonly used in the generation of alternating current.

A still further object is to provide such apparatus which, by reason of the compactness and ruggedness of its component parts, will be readily incorporated in portable instruments.

Figure 1:
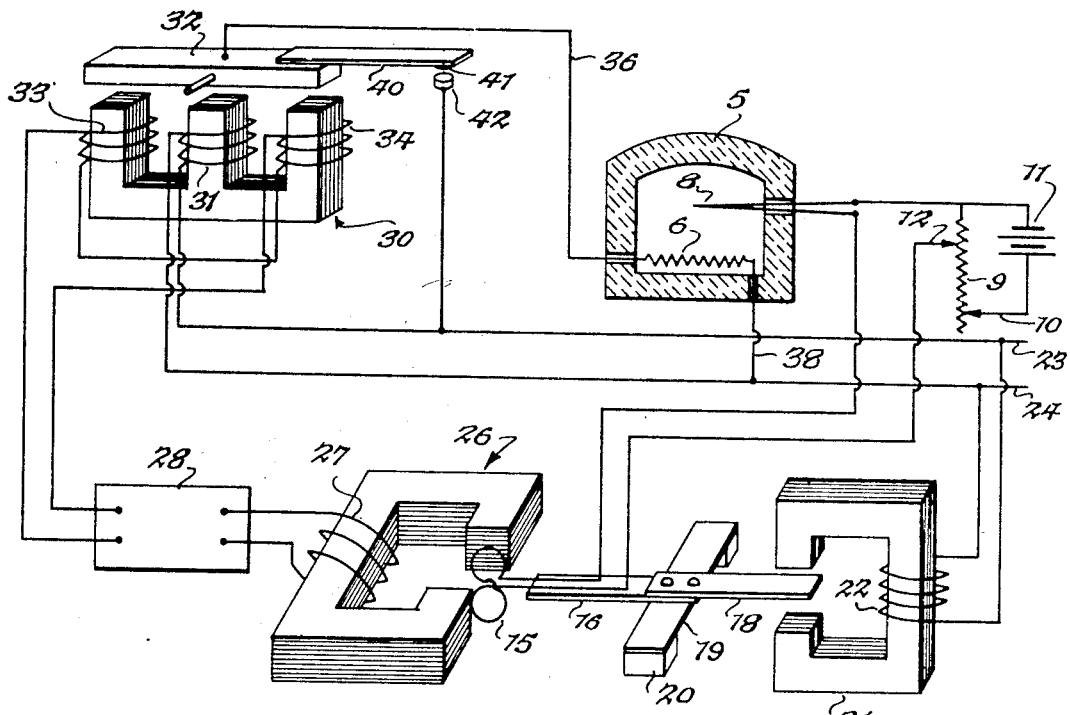
Fig. 1 is a diagrammatic representation of the application of the invention to a very simple type of furnace temperature control in which a thermocouple is employed as the controlling element.

In the form of the invention illustrated in Fig. 1, the numeral 5 represents a furnace heated by a resistance element 6. A thermocouple 8 projects into the furnace and generates a D. C. voltage dependent upon the temperature of the furnace. One side of this thermocouple is connected with a resistance 9 having an adjustable tap 10 which controls the amount of current from a battery 11 flowing through this resistance. A second adjustable tap 12 on the resistance 9 furnishes a means for placing a small variable voltage in series opposition to the voltage generated by the thermocouple 8. This voltage in series opposition to the voltage generated by the thermocouple 8 is adjusted to equal that generated by the thermocouple 8 when the furnace has reached the desired temperature which the apparatus has been set to maintain.

When these voltages are unequal, current will flow through the figure 8 coil 15 in circuit with the thermocouple 8 and adjustable tap 12, the direction of the current passing through this figure 8 coil depending upon which of the two voltages is greater. The loops of the figure 8 coil 15 are vertically disposed and this coil is mounted on the end of a vibrating reed 16, a permanent magnet 18 being secured to the other end of the reed 16. The connected ends of this reed 16 and permanent magnet 18 are attached to the center of a flexible strip 19 which extends transversely of the reed and permanent magnet assembly and about which the reed and magnet assembly vibrate as a center. The ends of the strip 19 are mounted on blocks 20.

Vibration of the reed and magnet assembly 16, 18 is maintained by reaction between the permanent magnet 18 and an A. C. magnet 21. Current for the windings 22 of the A. C. magnet 21 is supplied from main power lines 23 and 24 and this current causes alternate attraction and repulsion of the permanent magnet 18 between opposite poles of the A. C. magnet 21. This causes the reed and magnet assembly 16 and 18 to be vibrated in a vertical direction around the flexible strip 19 as a center and thereby effects the vibration, in a vertical plane, of the figure 8 coil 15. The magnetic field established by the current in the figure 8 coil 15 is in opposite directions in the two halves of the coil. This figure 8 coil vibrates in an air gap of a magnetic structure 26, this magnetic structure being shown as comprising a laminated body of C-shaped form having a pickup coil 27 wound thereon. When the upper half of the figure 8 coil 15 is in the air gap of the magnetic structure 26, magnetic flux will pass in one direction through the pickup coil 27 and when the lower half of the figure 8 coil 15 is in the air gap, the magnetic flux will flow in the other direction. An alternating voltage is thus generated in the pickup coil 27, the magnitude and direction of which depends upon the magnitude and direction of the current flowing through the figure 8 coil 15. This voltage, after passing through an amplifier 28, is employed to operate a phase shift relay 30.

This phase shift relay 30 is in the form of an E-shaped magnetic structure having a central polarizing coil 31 which is energized by the main A. C. power supply lines 23, 24. The magnetic pull generated by the polarizing coil 31 is equal at both ends of a centrally pivoted armature 32 and does not cause this armature to rotate. The phase shift relay is provided with end coils 33 and 34 which are so connected in series with the amplifier 28 that one coil aids and the other opposes the magnetic effect of the polarizing coil 31. As a result the alternating current flowing through the end coils 33 and 34 decreases the magnetic pull at one end of the armature 32 and increases it at the other end. The direction of the effect depends upon the polarity of the current in the end coils 33 and 34. For most efficient operation the phase adjustment should be such that currents in the two sets of coils are exactly in phase or 180° out of phase. The armature 32 is connected by a line 36 with the resistance element 6 of the furnace 5, the other end of this resistance element being connected by a line 38 with the side 24 of the main power line. This armature 32 also carries a flexible strip 40 having a contact 41 which is arranged to make contact with a terminal 42 connected with the other side 23 of the main power line.

When the contact 41 is in contact with the terminal 42, current is supplied to the resistance element 6 from the main A. C. power lines 23, 24. The temperature of the furnace 5 therefore rises and the thermocouple 8 generates a higher voltage. This increase of the voltage generated by the thermocouple 8, through the vertically vibrating figure 8 coil 15, magnetic assembly 26 and amplifier 28, causes the coil 34 of the phase shift relay 30 to exert a decreased pull on the corresponding end of the armature 32. Therefore, when the temperature of the furnace has reached a value sufficient to cause the release of the armature 32, the contact between the contact 41 and terminal 42 is broken and current is cut off from the resistance 6 in the furnace. The furnace then cools until the phase shift relay 30 again operates to close the circuit through the resistance 6. By this means the furnace 5 is maintained at a substantially constant temperature.

Figure 2:
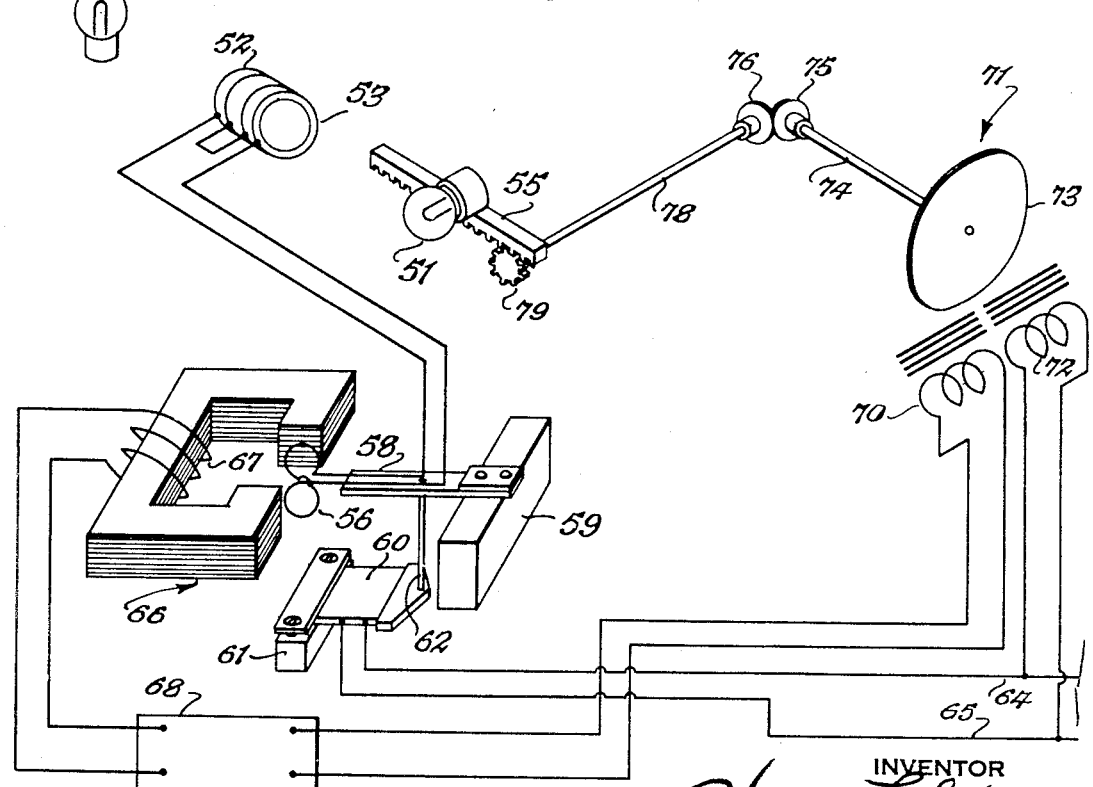
Fig. 2 is a similar diagrammatic representation of the application of a modified form of the invention to balance a photometer for the comparison of the relative intensities of two sources of light.

In Fig. 2 the invention is employed to automatically balance a photometer employed to compare the relative intensity of two sources of light. The light sources to be compared are represented by the incandescent lamps 50 and 51, of which lamp 50 may be taken as the standard. Light from each of these sources falls, respectively, upon two similar photoelectric cells 52 and 53 which are shown placed back to back so that each cell is illuminated by one source only. In the arrangement these cells are of the photovoltaic type which generate a voltage upon being exposed to light. The photoelectric cells 52 and 53 are connected in series opposition and the direction of the current generated by the combination of photocells will therefore depend upon which cell has the most light falling upon it. The lamp 51 is mounted on a rack 55 which permits of adjusting the lamp 51 toward and from the combination of photocells, thereby to vary the amount of light falling upon the photocell 53 and make it possible to balance the voltages generated by the photocells 52 and 53. The rack 55 is automatically adjusted to obtain this balance of the voltages generated by the photocells as hereinafter described.

When the voltages generated by the combination of photocells 25, 26 are unequal, due to different amounts of light falling upon them from the light sources 50 and 51, the resultant current will flow through the figure 8 coil 56 which is similar to the figure 8 coil 15 of the form of the invention shown in Fig. 1. This figure 8 coil 56 is mounted on the free end of a reed 58, the opposite end of which is supported upon a block 59. Vibration of the figure 8 coil 56 and the reed 58 is produced by a Rochelle salt crystal 60. This Rochelle crystal is preferably in the form of rectangular plates cut from a large crystal and placed between electrodes (not shown) in a manner well known to the art of sound recording and reproduction, such crystals being commonly used to convert varying voltage to corresponding vibrations. The application of voltage to the electrodes causes the crystal 60 to bend in accordance with the direction and magnitude of the applied voltage. One end of this crystal 60 is shown as clamped rigidly to a supporting block 61 while its free outer end is free to move when voltage is applied to the crystal. This free end of the crystal is connected by a vertical drive pin 62 with the reed 58. When A. C. voltage is applied to the crystal 60, the reed 58 is vibrated by the crystal. For this purpose the electrodes of the crystal 60 are connected directly to the main A. C. power supply lines 64 and 65. The natural period of vibration of the reed 58 and the figure 8 coil 56 should be adjusted to equal that of the supply voltage to the crystal 60.

As in the form of the invention shown in Fig. 1, the figure 8 coil vibrates vertically in the air gap of a magnetic structure 66 having a pickup coil 67 which is connected with an amplifier 68. As the figure 8 coil 56 vibrates in this air gap it varies the magnetic flux passing through the pickup coil 67 and generates a corresponding A. C. voltage, the magnitude and direction of which is dependent upon the magnitude and polarity of the unbalanced direct current flowing through the figure 8 coil 56.

The resulting voltage, amplified by the amplifier 68, is then applied to one winding 70 of a two phase motor indicated generally at 71. The other winding 72 of this motor is permanently energized by the main A. C. power supply lines 64 and 65. The phase adjustment is such that the voltage delivered by the amplifier 68 is 90° or 270° out of phase with the voltage supply depending upon the direction of current in the figure 8 coil 56. The motor 71 is constructed generally as indicated, with a conducting disk 73 fast to the motor shaft 74, the conducting disk being preferably made of aluminum to obtain a low inertia effect. This conducting disk 73 is arranged in the adjoining magnetic fields of the two separately energized A. C. coils 70 and 72. A motor so constructed is very simple and inexpensive, and also the motor will not run when one phase is deenergized, as is the case with more efficient two phase motors. Thus, when the coil 70 is deenergized, the coil 72 acts as an electromagnetic brake to stop the disk 73 and prevent overshooting.

The motor shaft 74 is connected by a pair of bevel gears 75 and 76 with a shaft 78 carrying a pinion 79 which meshes with the rack 55. This rack carries the adjustable light source 51 and hence the adjustment of this light source or lamp toward and from the photocell 53 is effected by the rotation of the two phase motor 71.

Connections are made so that whenever an unbalance accurs between the amounts of light falling upon the combination of photocells 52, 53 from their light sources 50 and 51, the two phase motor 71 will rotate in a direction to cause the light source 51 to move and reestablish a balance. The relative intensities of the light sources 50 and 51 may then be calculated by the inverse square law.

In both forms of the invention shown, the elements employed to convert the unbalance direct current into alternating current are not subject to wear or other harmful effects under conditions of severe and constant use, and will require no adjustment or replacement of parts. In itself the conversion unit is not a source of current or voltage, and is not affected materially by temperature changes. It is, however, necessary to shield the magnetic structures 26 and 66 with their pickup windings 27 and 67 from the effects of stray alternating current magnetic fields which would cause a disturbing effect. In the form of the invention shown in Fig. 1, the stray field from the magnet 21 has little or no effect upon the magnetic structure 26 and its pickup coil 27 if this magnet 21 is alined exactly at right angles to the magnetic structure 26.

It will be seen that the usefulness of the invention is not limited to the application as described above and that the invention can be applied in any case where it is desired to detect the polarity or magnitude of a direct current voltage and to employ the polarity or magnitude of a direct current voltage for indicating, recording or control purposes. It is readily adaptable to any of the arrangements discussed in my said copending application Ser. No. 402,802 with resultant advantages in reliability and low cost.

Various modifications and simplifications may be made in the arrangement shown when the invention is applied to specific uses. Vibration of the figure 8 coil may be secured by means other than the alternating current magnet or the Rochelle salt crystal shown. Arrangements can also be easily devised whereby either the magnetic structure 26 shown in Fig. 1 or its pickup coil 27 can be vibrated to produce an A. C. voltage in the pickup coil, the same being true of the similar magnetic structure and magnetic coil shown in Fig. 2. An A. C. voltage can also be generated in the pickup coil 27 in the form of the invention shown in Fig. 1, or 67 in the form of the invention shown in Fig. 2, by a saturable magnetic structure controlled by alternating current, no vibrating or moving elements being employed. The apparatus does not necessarily include an amplifier, and may assume a simple form, such as a telephone receiver, which is highly responsive to certain frequencies. To detect the phase of the alternating current and therefore the polarity of the direct current, means such as a wattmeter may be employed with its stationary coils energized by the A. C. supply and its movable coils energized by the generated A. C. voltage. Further, various vacuum tube circuits or contacting devices may be employed for the detection of phase reversal and the subsequent operation of indicating or control equipment.

From the foregoing it will be seen that the invention is not limited to the precise embodiments shown but is to be accorded the full range of equivalents comprehended by the following claims.

I claim as my invention:

1. Apparatus for detecting the polarity of an unknown direct current, comprising a field coil through which said direct current passes, a pickup coil, vibrating means varying the inductive relation of said field coil with said pickup coil, and means comparing the phase of the alternating current generated in the pickup coil with the phase of motion of the vibrating means.

2. Apparatus for detecting the polarity of an unknown direct current, comprising a field coil through which said direct current passes, a pickup coil, a vibrating element varying the inductive relation of said field coil with said pickup coil, means amplifying the alternating current voltage generated in said pickup coil, and means combining the magnetic field produced by said amplified alternating current voltage with a magnetic field synchronized with the vibration of said vibrating element, said last named means being responsive to phase reversal of said amplified alternating current voltage.

3. Apparatus for controlling a condition associated with the flow of direct current in an electric circuit, comprising a coil in said electric circuit, a second coil, a vibrating element varying the inductive relation of said coil with said second coil, means amplifying the alternating current voltage induced in said second coil, and means combining the magnetic field produced by said amplified alternating current with a magnetic field synchronized with said vibrating element, said last named means being responsive to phase reversal of said amplified alternating current to control said condition.

4. The method of balancing a direct electromotive force of unknown magnitude which comprises opposing said electromotive force by a second electromotive force, passing the current produced by the resultant electromotive force through a coil, periodically varying the inductive relation of said coil with a second coil, amplifying the voltage produced in said second coil and employing the phase of said amplified voltage to adjust one of said electromotive forces.

5. Apparatus for detecting a direct current, comprising a field coil carrying said direct current, a pickup coil magnetically linked with said field coil, a voltage responsive crystal vibrated by alternating current voltage, means causing said vibrating crystal to vary the inductive relation between said field coil and said pickup coil, and means responsive to the alternating current generated in said pickup coil.

6. Apparatus for detecting a direct current, comprising a field coil carrying said direct current, a pickup coil magnetically linked with said field coil, a voltage responsive crystal vibrated by alternating current voltage and actuating said field coil to vary its inductive relation with said pickup coil, and means responsive to the alternating current generated in said pickup coil.

HENRY LEHDE.